Figure 1:
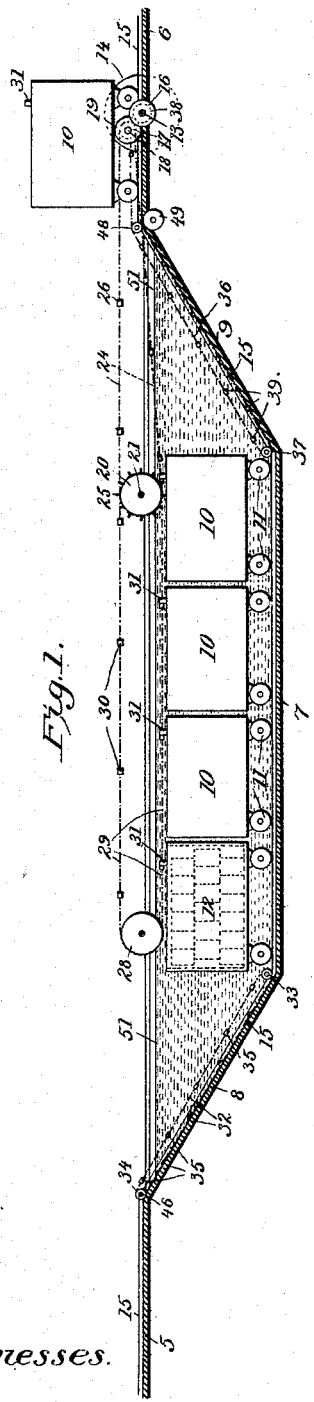
Figure 2:
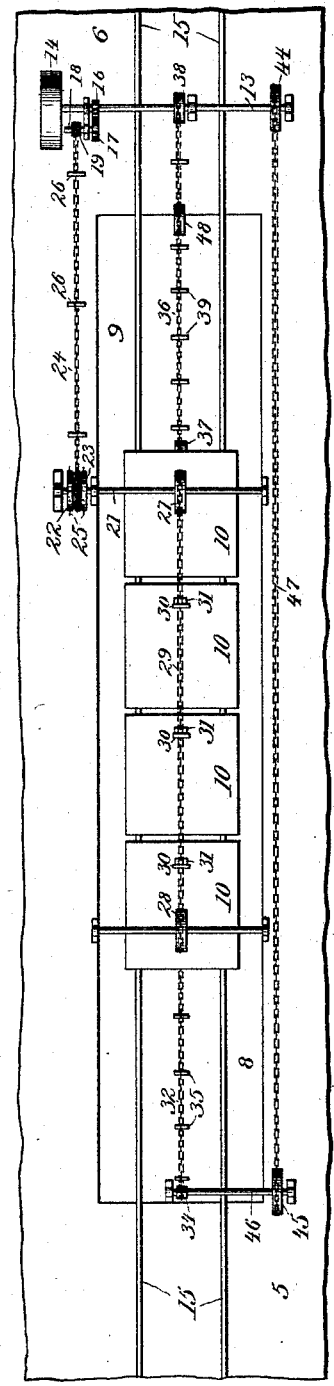

(No Model.)

F. M. ANDERSON.
COOKING DEVICE FOR FRUIT CANNING.

No. 522,748. Patented July 10, 1894.

Witnesses.
P. E. Stevens.
M. C. Hillyard.

Inventor
Frank M. Anderson.
by W. X. Stevens, Atty.

THE NORRIS PETERS CO., PHOTO-LITHO., WASHINGTON, D. C.

UNITED STATES PATENT OFFICE.

FRANK M. ANDERSON, OF KEOKUK, IOWA.

COOKING DEVICE FOR FRUIT-CANNING.

SPECIFICATION forming part of Letters Patent No. 522,748, dated July 10, 1894.

Application filed March 30, 1894. Serial No. 505,736. (No model.)

*To all whom it may concern:*

Be it known that I, FRANK M. ANDERSON, a citizen of the United States, residing at Keokuk, in the county of Lee and State of Iowa, have invented certain new and useful Improvements in Cooking Devices for Fruit-Canning; and I do hereby declare the following to be a full, clear, and exact description of the invention, such as will enable others skilled in the art to which it appertains to make and use the same.

This invention relates in general to that step in the process of canning fruits by which the fruit is properly cooked to prepare it to be kept in the cans, and it relates more particularly to a scalding or cooking tank and mechanical means for moving truck loads of filled cans by intermittent steps through the tank at a slow rate of speed, and up out of the tank at a quicker speed.

To this end my invention consists in the construction and combination of parts forming a "cooking device for fruit canning" hereinafter described and claimed, reference being had to the accompanying drawings, in which—

Figure I, represents a tank in longitudinal vertical section showing a series of trucks and portions of the machinery in side elevation. Fig. II, is a plan or top view of the same.

5 and 6 represent what may be called a floor.

7 represents a cooking tank below the floor line and having its two ends 8 and 9 slanted therefrom.

15 represent rails extending along the floor and down along the ends and bottom of the tank so that trucks 10, each mounted upon wheels 11, may roll down the incline 8 into the tank and up the incline 9 out of it. Each truck is to be loaded with filled cans as represented in the drawings by the dotted lines 12. The tank is to be kept filled with water to a level 51, somewhat above the top of the trucks 10, or of the cans therein. The water in the tank may be kept hot by any usual means.

13 represents the main driving shaft, and 14 is a pulley mounted thereon to receive rotary motion from any suitable source of power.

16 is a pinion gear wheel fixed on the shaft 13 engaging a spur wheel 17 on the shaft 18.

19 is a pinion sprocket wheel fixed on shaft 18, and 20 is a spur sprocket wheel mounted to revolve freely on the shaft 21.

22 and 23 represent a pair of wheels fixed upon the shaft 21 near the sides of the wheel 20 but far enough therefrom to permit the sprocket chain 24 to travel on the wheels 19 and 20 without touching the wheels 22, 23. The wheels 22, 23 are provided with projecting arms or spokes 25, to be engaged by crossbars 26 which are secured to the chain 24 to project beyond the sides thereof. These crossbars are located much farther apart on the chain than the distance between spokes 25 whereby a continuous rotary motion of the chain produces an intermittent motion of the spoke wheels and their shaft 21.

27 is a sprocket wheel fixed on the shaft 21, and 28 is a sprocket wheel journaled at the opposite end of the tank 7 to carry a chain 29 having lugs 30 fixed upon it to engage posts 31 which project upward from the trucks 10, whereby the cars and their contents will be drawn through the tank.

32 is a sprocket chain mounted on wheels 33, 34 and provided with lugs 35 adapted to engage the axles of the trucks to first pull and then to steady them down into the tank.

36 is a sprocket chain mounted on wheels 37, 38 and passing over the intermediate wheels 48 and 49 to turn the floor corner from the tank. This chain is provided with lugs 39 to engage the truck axles and draw the trucks and contents up the incline 9 out of the tank onto the floor.

The wheels 38 and 44 are fixed upon the main shaft 13 to revolve therewith.

47 is a chain communicating between a wheel 44 and a wheel 45 on the shaft 46, of the wheel 34. Thus the two end chains 32 and 36 are actuated to operate in unison and at equal speed, the one to introduce trucks into the tank and the other to deliver them therefrom.

I have not yet so perfected this part of my invention but that it requires a person to attend it and start the entering truck forward into engagement with the chain 32, whenever the trucks in the tank have advanced so as to admit another.

While it is not positively necessary to my invention yet I find it works most economically to proportion the speed of the chain 29, the driving spoke wheels 22, 23, and the spaces between the lugs 26 on chain 24 so that each time the wheels 22, 23 are revolved or partly revolved by a lug 26 the chain 29 will advance the length of one truck.

I also find it best in the general practice of cooking or processing fruit, to so speed the driving mechanism that each truck is left in the tank about forty-three minutes. The speed of the delivery chain 36 is much more rapid, so that each truck is raised quickly out of the tank when it reaches the end thereof.

It is not necessary to my invention that the entering chain 32 shall be connected with the delivery mechanism by the chain 47 and the other coacting parts described, but I have so described it in order to show one complete mechanical arrangement for first entering the loaded trucks into the tank, then passing them along through it and finally delivering the trucks out of the tank upon the floor.

Other mechanical means may be used for giving the varied and intermittent motions described without varying from the spirit of my invention. Trucks mounted on wheels might be guided through the tank by other means than the track of rails described, and the time which they remain in the tank may be regulated by changing the speed of the driving mechanism, some kinds of fruits and vegetables requiring forty-five minutes to be cooked while forty minutes is enough for others.

Having described my invention, what I claim as new, and desire to secure by Letters Patent, is—

1. The combination of a scalding tank having slanting ends; fruit-can-carrying trucks mounted on wheels fitted to roll through the tank; a chain mounted on pulleys over the tank and provided with lugs to engage the tops of the said trucks and means for giving an intermittent motion to the chain, substantially as described.

2. The combination of a scalding tank having slanting ends; fruit-can-carrying trucks mounted on wheels fitted to roll through the tank; a chain mounted on pulleys over the tank and adapted to engage the said trucks; a pair of wheels mounted on the shaft with one of the said chain pulleys and having projecting spokes; a sprocket wheel mounted to revolve freely on the same shaft between the spoked wheels; a chain mounted on the said sprocket wheel and having cross-bars projecting to engage the said projecting spokes at intervals and means for rotating the last named chain, substantially as described.

3. The combination of a fruit scalding tank having slanting ends; fruit-can-carrying trucks mounted on wheels fitted to roll through the tank; a chain mounted on pulleys over the tank and adapted to engage the said trucks; a chain mounted on pulleys, extending up the delivery end of the tank and provided with means for engaging each car as it advances and for drawing the same up the incline substantially as described.

4. The combination of a fruit scalding tank slanting at its ends; fruit can-carrying trucks fitted to roll through the tank; a chain over the tank fitted to advance the trucks in the tank with a slow intermittent movement and a chain fitted to quickly deliver each coming truck from the tank to the floor, substantially as described.

5. The combination of a fruit scalding tank slanted at its ends; fruit-can-carrying trucks fitted to roll through the tank; a chain mounted over the tank to give a slow movement to the trucks; and chains at the inclined ends of the tank fitted to introduce the trucks into the tank and to deliver them out of the tank at intervals, substantially as described.

In testimony whereof I affix my signature in presence of two witnesses.

FRANK M. ANDERSON.

Witnesses:
M. H. LOGAN,
GEO. D. RAND.